United States Patent Office 3,118,485
Patented Jan. 21, 1964

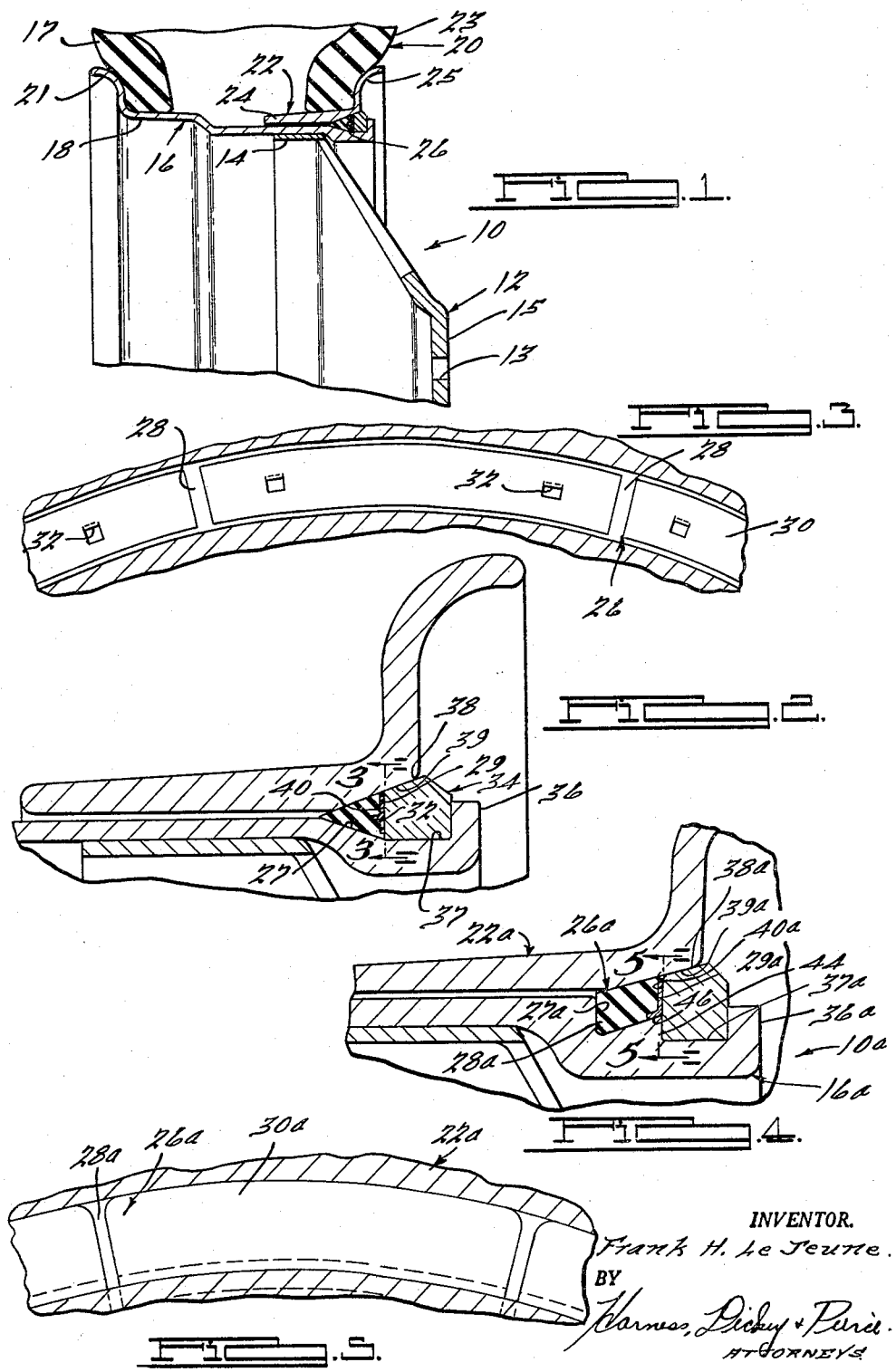

3,118,485
TUBELESS TIRE RIM STRUCTURE
Frank H. Le Jeune, Jackson, Mich., assignor to Kelsey-Hayes Company, Detroit, Mich., a corporation of Delaware
Filed Feb. 9, 1961, Ser. No. 88,075
7 Claims. (Cl. 152—410)

This invention relates to tire rims and more specifically to an improvement in tire rims which are to be utilized with tubeless pneumatic tires.

In large wheel rims for mounting tubeless truck tires the rim is frequently provided with a removable side ring which may be detached from the rim base to facilitate installation and removal of the tire. In such constructions, it is necessary to use a sealing ring of an elastic material to prevent a loss of air between the rim base and the removable side ring. In one common type of construction as disclosed in the United States patent to R. C. Shipman et al., 2,822,021, the sealing ring is held in place by the split metal lock ring which also holds the side ring in place. In this type of construction there is a tendency for the sealing ring to be extruded through the gap of the split lock ring by the pressure of the air which is sealed. Since in tire rims constructed as described there is some relative movement between the various components, there is a tendency for chafing to occur between the split ring which is metal and the elastic sealing ring which is usually of a resilient material such as rubber or the like. Both the extruding and the chafing tends to eventually cause leakage. The improvement in tire rim construction of this invention eliminates both of the above named disadvantages.

Therefore, it is an object of this invention to provide a rim for a tubeless pneumatic tire having an improved construction whereby the sealing ring which is held by the split lock ring cannot extrude through the gap in the lock ring.

It is a further object of this invention to provide a rim for a tubeless pneumatic tire having an improved construction whereby no chafing between the elastic material of the sealing ring and the split lock ring occurs.

It is an object of this invention to provide a rim for a tubeless pneumatic tire with a sealing ring having an improved construction whereby neither extruding nor chafing between the elastic material of the sealing ring and the split lock ring occurs and in which the sealing ring is sufficiently elastic to provide enough elongation to facilitate assembly.

Other objects, features and advantages of the present invention will become apparent from the subsequent description and the appended claims, taken in conjunction with the accompanying drawing, in which:

FIGURE 1 is a fragmentary sectional view showing a rim construction embodying the features of this invention;

FIGURE 2 is an enlarged view of a portion of the structure illustrated in FIGURE 1;

FIGURE 3 is a view taken along the line 3—3 in FIGURE 2;

FIGURE 4 is a view of structure similarly illustrated in FIGURE 2 showing another embodiment of the present invention; and FIGURE 5 is a view taken along the line 5—5 in FIGURE 4.

The features of this invention are shown by way of example in the drawing in which a rim assembly 10 in FIGURE 1 has a dished hub 12 terminating in an endless annular axially extending flange portion 14 to which an endless rim base member 16 is secured by welding or other means. The hub 12 has a plurality of holes 13 in a flat face portion 15 for mounting of the rim assembly 10 on a vehicle. One wall 17 of a tubeless tire 20 is held in the rim assembly 10 by an annular tire retaining flange portion 21 located at an axially outward extremity of the rim base 16. The wall 17 terminates in an annular bead which is in firm contact with an annular bead seat portion 18 of the rim base 16.

A removable endless side ring 22 is concentrically disposed about the extremity or side of the rim base 16 opposite the flange 21 and has an annular bead seat portion 24 in firm contact with an annular bead on the other wall 23 of the tubeless tire 20. An annular tire retaining flange portion 25 located at the axially outward extremity of the side ring 22 holds the other wall 23 of the tubeless tire 20. In order to provide a pneumatic seal between the removable side ring 22 and the rim base 16, a sealing ring 26 is disposed in a cavity 27 between the side ring 22 and rim base 16. The sealing ring 26 is formed to fit the shape of the cavity 27 which is defined by confronting portions of the rim base 16 and side ring 22 and which in FIGURE 2 is shown to be triangular or wedge-shaped in cross section. The sealing ring 26 (FIGURE 3) is composed of an endless wedge-shaped elastic ring 28 of rubber or some other suitable resilient and elastic material which has a plurality of closely spaced arcuate metal plates 30 disposed upon an axially outward face 29 thereof. The metal plates 30 which act as a cover for the surface 29 are initially copper plated in order to facilitate the adherence between the rubber ring 28 and the metal plates 30 during the molding process. A pair of tabs 32 individual to each of the plates 30 extends inwardly into the face 29 of rubber ring 28 and also helps to hold the plates 30 thereon. With this type of construction, the sealing ring 26 maintains the benefits of a sealing ring made solely of rubber or some other suitable resilient and elastic material which are conformability to shape for sealing purposes and elasticity for purposes of assembly, i.e., allowing the sealing ring to be stretched over the extremity of the rim base 26. On the other hand, the metal plates 30 provide a substantially continuous area of contact having a substantially hard surface relative to the elastic ring 28 and afford other advantages to be described.

The sealing ring 26, the side ring 22 and the rim base 16 are secured together by an annular split lock ring 34 (FIGURE 2). The ring 34 is held on the rim base 16 by an annular radially outwardly extending lip portion 36 of an annular gutter 37 and is split in order to facilitate assembly over the lip 36. The split ring 34 has an outwardly diverging tapered seat portion 38 conforming to and engageable with a tapered shoulder 39 on the continuous side ring 22 and also has a flat portion 40 in abutment with the plurality of flat plates 30 of the sealing ring 26. When the pneumatic tire 20 is pressurized, the force of the pressure tends to compact the assembly comprising the continuous side ring 22, the rim base 16, the sealing ring 26 and the split lock ring 34 and to form an airtight seal as shown in FIGURE 2.

With the above described construction, there is metal-to-metal contact between the plurality of plates 30 and the split ring 34, thus eliminating any chafing between the metal of the split ring 34 and the resilient material of the elastic ring 28. Also, since the plurality of metal plates 30 are located relatively close to each other, the elastic ring 28 cannot extrude through the gap in the retaining ring 34.

A modified construction of an improved rim assembly is shown in FIGURE 4 in which like numbers represent components similar to those bearing like numbers in the construction described above. In this modified construction, a rim assembly 10a has an endless side ring 22a concentrically disposed about an extremity of an endless rim base 16a. A sealing ring 26a is disposed within a cavity 27a between the side ring 22a and the ring base 16a. The sealing ring 26a is formed to fit the shape of the cavity 27a which in FIGURE 4 is shown to be rhombic in cross-section. The sealing ring 26a is composed of an endless elastic ring 28a of rubber or some other suitable resilient and elastic material having a rhombic cross-section and having a plurality of closely spaced arcuate metal plates 30a (FIGURE 5) molded to its axially outward face 29a. Each of the plates 30a has a lip 46 which overlays a portion of the lower surface of the elastic ring 26a and aids in securing the plates 30a thereto.

The sealing ring 26a, the side ring 22a and the rim base 16a are secured together by an annular split lock ring 34a (FIGURE 4). The ring 34a is held on the rim base 16a by being matably disposed within an annular gutter 37a defined by an annular lip 36a and an annular rib 44. The lock ring 34a is split to facilitate assembly over the lip 36a into gutter 37a and has a conical seat portion 38a in abutment with an inwardly facing conical surface 39a on the continuous side ring 22a. When a pneumatic tire (not shown) is mounted on the rim 10a and is pressurized, the force of the pressure tends to compact the assembly comprising the continuous side ring 22a, the sealing ring 26a, the rim base 16a and the split lock ring 34a, and to form an air-tight seal as shown in FIGURE 4.

With the above described modified construction, there is metal-to-metal contact between the plurality of plates 30a and the split ring 34a, thus preventing chafing between the metal split ring 34a and the elastic ring 28a. Also, since the plurality of metal plates 30a are located relatively close to each other, the elastic ring 28a cannot extrude through the gap in the retaining ring 34a.

Thus, in the embodiments as shown in the drawing and as described above, a rim construction has been disclosed whereby no chafing between the elastic and resilient material of the sealing ring and split lock ring occurs and also whereby the elastic and resilent material of the sealing ring is held by the split lock ring without extruding through the gap in the lock ring.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A tire rim for a tubeless pneumatic tire comprising an endless rim base member, an endless side ring member disposed about one side of said rim base member, sealing means disposed between said rim base member and said side ring member for providing a pneumatic seal therebetween comprising an elastic ring and a plurality of circumferentially disposed plates secured to one side of said elastic ring and having the ends thereof closely spaced to prevent extrusion of said elastic ring outwardly from between said plates, and a lock ring disposed about said one side of said rim base member and being in restraining contact with said plurality of plates on said elastic ring and in axially restraining engagement with said side ring member.

2. A tire rim for a tubeless pneumatic tire comprising an annular endless rim base member, an annular endless side ring member disposed about one extremity of said rim base member, confronting portions of said rim base member and of said side ring member defining an annular cavity, sealing means disposed between said rim base member and said side ring member for providing a pneumatic seal therebetween comprising an elastic ring of elastic and resilient material disposed in direct contact with the surfaces of said cavity and a plurality of circumferentially disposed plates fixed to a portion of the surface of said elastic ring facing outwardly from said cavity and having the ends thereof closely spaced to prevent extrusion of said elastic ring outwardly from between said plates, an annular split ring disposed about said one extremity of said rim base member and being in restraining contact with said plurality of plates on said elastic ring and in axially restraining engagement with said side ring member, and retaining means on said one extremity of said rim base member for holding said lock ring.

3. The apparatus of claim 2 with said retaining means comprising an annular gutter located on said one extremity of said rim base.

4. The apparatus of claim 2 with said plurality of plates annularly disposed in a closely spaced relationship with one another and with each of said plurality of plates being arcuately shaped and having a plurality of tabs in engagement with said elastic ring.

5. The apparatus of claim 2 with said plurality of plates annularly disposed in a closely spaced relationship with one another and with each of said plurality of plates being arcuately shaped and having a transversely extending lip portion at one extremity in overlapping engagement with said elastic ring.

6. A tire rim for a tubeless pneumatic tire comprising an endless rim base member, an endless side ring member disposed about one extremity of said rim base member, confronting portions of said rim base member and of said side ring member defining an annular cavity having a wedge-shaped cross-section, sealing means disposed within said cavity for providing a pneumatic seal between said rim base member and said side ring member comprising an elastic ring of elastic and resilient material having a cross-sectional configuration similar to and directly matable with that of said cavity and a plurality of arcuately-shaped plates annularly fixed in a closely spaced relationship with one another to a portion of the surface of said elastic ring whereby extrusion of said elastic ring outwardly from between said plates is prevented and with each of said plurality of plates having a plurality of tabs in engagement with said elastic ring, an annular split lock ring disposed about said one extremity of said rim base member and being in restraining contact with said plurality of plates on said elastic ring and having a seat portion in matable engagement with a portion of said side ring member for restraining said side ring member, and retaining means on said one extremity of said rim base member for holding said lock ring comprising an annular radially outwardly extending lip in engagement with said lock ring.

7. A tire rim for a tubeless pneumatic tire comprising an endless rim base member having an annular gutter at one end defined by an annular radially outwardly extending lip and an annular radially outwardly extending rib axially spaced from said lip, an endless side ring member disposed about one extremity of said rim base member, confronting portions of said rim base member and of said side ring member defining an annular cavity having a rhombic-shaped cross-section, sealing means disposed within said cavity for providing a pneumatic seal between said rim base member and said side ring member comprising an elastic ring of elastic and resilient material having a cross-sectional configuration similar to that of said cavity and a plurality of arcuately-shaped plates annularly fixed in a closely spaced relationship with one another to a portion of the surface of said elastic ring and with each of said plurality of plates having a lip portion at one extremity in overlapping engagement with said elastic ring, an annular split lock ring disposed in said gutter on said rim base member and being in restraining contact with said plurality of plates on said elastic ring and having a seat portion in matable engagement with a portion of said side ring member for restraining said side ring member.

References Cited in the file of this patent

UNITED STATES PATENTS

| | | |
|---|---|---|
| 2,230,725 | Nathan | Feb. 4, 1941 |
| 2,822,017 | Herzegh | Feb. 4, 1958 |
| 2,827,100 | Herzegh | Mar. 18, 1958 |
| 2,884,984 | Riggs | May 4, 1959 |
| 2,964,357 | Barnes | Dec. 13, 1960 |